(12) United States Patent
Isaka et al.

(10) Patent No.: US 10,557,006 B2
(45) Date of Patent: *Feb. 11, 2020

(54) COMPOSITION, AND METHOD FOR PRODUCING FOAM MOLDED MATERIAL AND ELECTRIC WIRE

(71) Applicant: DAIKIN INDUSTRIES, LTD., Osaka-Shi, Osaka (JP)

(72) Inventors: Tadaharu Isaka, Settsu (JP); Kenji Ishii, Settsu (JP); Takeshi Shimono, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 142 days.

This patent is subject to a terminal disclaimer.

(21) Appl. No.: 14/761,138

(22) PCT Filed: Jan. 15, 2014

(86) PCT No.: PCT/JP2014/050580
§ 371 (c)(1),
(2) Date: Jul. 15, 2015

(87) PCT Pub. No.: WO2014/115624
PCT Pub. Date: Jul. 31, 2014

(65) Prior Publication Data
US 2015/0353700 A1    Dec. 10, 2015

(30) Foreign Application Priority Data

Jan. 24, 2013 (JP) ................................. 2013-011484
Apr. 19, 2013 (JP) ................................. 2013-088771

(51) Int. Cl.
*C08J 9/00*        (2006.01)
*B05D 5/00*      (2006.01)
(Continued)

(52) U.S. Cl.
CPC .............. *C08J 9/0033* (2013.01); *B05D 5/00* (2013.01); *B05D 7/20* (2013.01); *B29C 48/154* (2019.02);
(Continued)

(58) Field of Classification Search
USPC ........ 428/304.4, 36.5, 401, 402; 521/50, 82, 521/85, 89, 99, 120, 121
See application file for complete search history.

(56) References Cited

U.S. PATENT DOCUMENTS 3,072,583 A    1/1963   Randa
4,711,811 A    12/1987   Randa
(Continued)

FOREIGN PATENT DOCUMENTS

CN    102640311 A    8/2012
EP     0648832 A1    4/1995
(Continued)

OTHER PUBLICATIONS

Communication dated Jun. 27, 2016 from the European Patent Office issued in Application No. 14743297.5.
(Continued)

*Primary Examiner* — Matthew D Matzek
(74) *Attorney, Agent, or Firm* — Sughrue Mion, PLLC (57) ABSTRACT

A composition which can provide foamed moldings and foamed electric wires having a small average cell size and a high foam content and causing fewer sparks. The composition includes a fluororesin (A) and a compound (B) which is a sulfonic acid or a salt thereof. The sulfonic acid is represented by the following formula (1): $F(CF_2)_n SO_3H$ (1) wherein n is 4 or 5, or the following formula (2): $F(CF_2)_n CH_2CH_2SO_3H$ (2) wherein n is 4 or 5. Also disclosed is a foamed molding formed from the composition and a method for producing a foamed molding.

10 Claims, 1 Drawing Sheet

(51) Int. Cl.
  *B05D 7/20* (2006.01)
  *H01B 3/44* (2006.01)
  *C09D 127/18* (2006.01)
  *C08J 9/12* (2006.01)
  *B29C 48/40* (2019.01)
  *B29C 48/92* (2019.01)
  *B29C 48/154* (2019.01)
  *B29C 48/00* (2019.01)

(52) U.S. Cl.
  CPC ............ *B29C 48/402* (2019.02); *B29C 48/92* (2019.02); *C08J 9/0023* (2013.01); *C08J 9/122* (2013.01); *C09D 127/18* (2013.01); *H01B 3/445* (2013.01); *B29C 48/0012* (2019.02); *B29C 48/022* (2019.02); *B29C 2948/926* (2019.02); *B29C 2948/92704* (2019.02); *B29C 2948/92876* (2019.02); *C08J 2201/03* (2013.01); *C08J 2203/06* (2013.01); *C08J 2205/044* (2013.01); *C08J 2207/06* (2013.01); *C08J 2327/12* (2013.01); *C08J 2327/20* (2013.01); *Y10T 428/294* (2015.01)

(56) References Cited

U.S. PATENT DOCUMENTS

| | | | |
|---|---|---|---|
| 4,716,073 | A | 12/1987 | Randa |
| 4,764,538 | A | 8/1988 | Buckmaster et al. |
| 4,877,815 | A | 10/1989 | Buckmaster et al. |
| 5,023,279 | A | 6/1991 | Buckmaster et al. |
| 5,032,621 | A | 7/1991 | Buckmaster et al. |
| 5,180,754 | A * | 1/1993 | Morita .................. C08J 9/0066 521/79 |
| 5,610,203 | A * | 3/1997 | Buckmaster ........... C08J 9/0066 521/143 |
| 5,688,457 | A | 11/1997 | Buckmaster et al. |
| 5,712,318 | A | 1/1998 | Buckmaster et al. |
| 5,726,214 | A | 3/1998 | Buckmaster et al. |
| 5,945,478 | A * | 8/1999 | Buckmaster ............ B29C 47/00 524/650 |
| 7,122,609 | B2 | 10/2006 | Earnest, Jr. et al. |
| 7,126,056 | B2 | 10/2006 | Earnest, Jr. et al. |
| 7,723,615 | B2 | 5/2010 | Kono et al. |
| 2002/0061934 | A1 | 5/2002 | Hrivnak |
| 2004/0198886 | A1* | 10/2004 | Shiotsuki ............... C08J 9/0066 524/404 |
| 2007/0149671 | A1 | 6/2007 | Shiotsuki et al. |
| 2009/0044965 | A1 | 2/2009 | Kono et al. |
| 2010/0288533 | A1 | 11/2010 | Burch et al. |
| 2011/0272173 | A1 | 11/2011 | Shiotsuki et al. |
| 2012/0230043 | A1 | 9/2012 | Kitagawa et al. |
| 2016/0005506 | A1 | 1/2016 | Isaka et al. |

FOREIGN PATENT DOCUMENTS

| | | |
|---|---|---|
| JM | 2010-513675 A | 4/2010 |
| JP | 59-11340 A | 1/1984 |
| JP | 63-24503 A | 2/1988 |
| JP | 63-110508 A | 5/1988 |
| JP | 1-172431 A | 7/1989 |
| JP | 6-89166 A | 11/1994 |
| JP | 6-89166 B | 11/1994 |
| JP | 8-12796 A | 1/1996 |
| JP | 10-36545 A | 2/1998 |
| JP | 10-45931 A | 2/1998 |
| JP | 10-195216 A | 7/1998 |
| JP | 2000-511124 A | 8/2000 |
| JP | 2000-344927 A | 12/2000 |
| JP | 2004-155946 A | 6/2004 |
| JP | 2010-513675 A | 4/2010 |
| JP | 2010-513676 A | 4/2010 |
| JP | 2010-513677 A | 4/2010 |
| JP | 2010-539252 A | 12/2010 |
| JP | 2014-224228 A | 12/2014 |
| JP | 2014-224229 A | 12/2014 |
| WO | 97/44383 A1 | 11/1997 |
| WO | 03/000792 A1 | 1/2003 |
| WO | 2006/123694 A1 | 11/2006 |
| WO | 2008/079262 A2 | 7/2008 |
| WO | 2008/079263 A2 | 7/2008 |
| WO | 2008/079264 A2 | 7/2008 |

OTHER PUBLICATIONS

Communication dated Jun. 27, 2016 from the European Patent Office issued in Application No. 14743532.5.
English Translation of International Report on Patentability and Written Opinion of the International Seaching Authority for related PCT/JP2014/050568.
English Translation of the International Preliminary Report on Patentability and Written Opinion of the International Searching Authority for PCT/JP2014/050580.
International Search Report for PCT/JP2014/050568 dated Mar. 11, 2014.
International Search Report of PCT/JP2014/050580 dated Mar. 11, 2014 [PCT/ISA/210].
Communication dated Jul. 3, 2017, from the U.S. Appl. No. 14/759,089.
Communication dated Dec. 26, 2017 from the U.S. Appl. No. 14/759,089.
Communication dated Jul. 6, 2018 from the U.S. Appl. No. 14/759,089.
Communication dated Feb. 6, 2019, from U.S. Appl. No. 14/759,089.

* cited by examiner

COMPOSITION, AND METHOD FOR PRODUCING FOAM MOLDED MATERIAL AND ELECTRIC WIRE

CROSS REFERENCE TO RELATED APPLICATIONS

This application is a National Stage of International Application No. PCT/JP2014/050580, filed Jan. 15, 2014, claiming priority based on Japanese Patent Application Nos. 2013-011484, filed Jan. 24, 2013 and 2013-088771, filed Apr. 19, 2013, the contents of all of which are incorporated herein by reference in their entirety.

TECHNICAL FIELD

The present invention relates to a composition and methods for producing a foamed molding and an electric wire.

BACKGROUND ART

Covering materials for electric wires are desired to have a reduced permittivity so as to improve the electrical characteristics. Such reduction in permittivity can effectively be achieved by using foams as covering materials. Foams made of resin material can usually be produced by a foam-molding process in which gas is introduced into a molten resin and then molded.

In order to equalize the shape and the properties of the resulting foam, the cells in the foam are preferably fine and uniformly distributed therein. For the purpose of making the cells fine and of distributing the cells uniformly, a foam nucleating agent, which is to serve as the starting point of generating cells during the foam molding, may be introduced into a resin.

Examples of the foam nucleating agent added to a resin (e.g., fluororesin) include sulfonic acid salts. The following disclosures provide exemplary methods for producing a foam using a sulfonic acid salt.

Patent Literature 1 discloses a foamable thermoplastic resin composition for extrusion molding comprising at least one thermally stable compound as a nucleating agent in an effective amount for nucleation, the compound being selected from the group consisting of sulfonic acids, phosphonic acids, and salts thereof.

Patent Literature 2 discloses a method of foaming a melt-processible fluoropolymer resin in the presence of a boron nitride nucleating agent and (a) at least one polyatomic anion-containing inorganic salt, (b) at least one selected from sulfonic acids, phosphonic acids, and salts of the acids, or (c) combination of (a) and (b).

Patent Literature 3 discloses a foamable thermoplastic resin composition comprising a thermoplastic resin and a nucleating agent system in an essentially effective amount for nucleation, the system comprising (a) at least one selected from sulfonic acids, phosphonic acids, and salts thereof, or (b) at least one polyatomic anion-containing inorganic salt, and the resin composition excluding boron nitride.

Patent Literature documents 4, 5, and 6 disclose a foamable composition comprising a partially crystalline melt-processible perfluoropolymer and a foam nucleating agent. The documents also disclose that the foam nucleating agent contains a nucleating effective amount of at least one thermally stable compound selected from the group consisting of sulfonic acids, phosphonic acids, and salts thereof.

Patent Literature 7 discloses a composition for molding, comprising a melt-moldable tetrafluoroethylene/hexafluoropropylene copolymer, a tetrafluoroethylene/perfluoro(alkyl vinyl ether) copolymer, and a foam nucleating agent. The foam nucleating agent is a mixture of boron nitride, calcium tetraborate, and $F(CF_2)_nCH_2CH_2SO_3Ba$ (n=6, 8, 10, or 12)

Patent Literature documents 8, 9, and 10 disclose combination use of boron nitride having a surface area of 8.6 $m^2/g$ with any of sulfonic acids, phosphonic acids, and salts thereof.

Patent Literature 11 discloses a method of extrusion-foaming a melt-processible fluoropolymer resin. In this method, a nucleating agent used is boron nitride, calcium tetraborate, $F(CF_2)_nCH_2CH_2SO_3Ba$ (wherein n is 6, 8, 10, or 12 in some cases, and mainly 8), or the like.

CITATION LIST

Patent Literature

Patent Literature 1: JP H06-89166 B
Patent Literature 2: JP H10-45931 A
Patent Literature 3: JP H10-36545 A
Patent Literature 4: JP 2010-513675 T
Patent Literature 5: JP 2010-513676 T
Patent Literature 6: JP 2010-513677 T
Patent Literature 7: US 2010/0288533 A
Patent Literature 8: JP S59-11340 A
Patent Literature 9: JP H01-172431 A
Patent Literature 10: JP H10-195216 A
Patent Literature 11: JP 2000-511124 T

SUMMARY OF INVENTION

Technical Problem

Use of a conventional sulfonic acid having a long fluoroalkyl group or a salt thereof as a foam nucleating agent have caused a failure in producing foamed moldings and foamed electric wires which can deal with environmental issues such as those relating to perfluorooctane sulfonate (PFOS), which have a small average cell size and a high foam content, and which cause fewer sparks.

In consideration of the aforementioned situation, the present invention aims to provide a composition capable of providing foamed moldings and foamed electric wires that have a small average cell size and a high foam content and cause fewer sparks.

Solution to Problem

The present inventors have performed various studies for producing foamed moldings and covering materials capable of providing foamed electric wires which have a small average cell size and a high foam content and which cause fewer sparks. Then, they have found that use of a composition containing a specific sulfonic acid or a salt thereof as a foam nucleating agent enables production of foamed moldings and foamed electric wires which have a small average cell size and a high foam content and which cause fewer sparks.

Specifically, the present invention relates to a composition comprising: a fluororesin (A); and a compound (B) which is a sulfonic acid or a salt thereof, the sulfonic acid being represented by the following formula (1):

$$F(CF_2)_nSO_3H \tag{1}$$

wherein n is 4 or 5, or the following formula (2):

F(CF$_2$)$_n$CH$_2$CH$_2$SO$_3$H (2)

wherein n is 4 or 5.

The compound (B) is preferably a sulfonic acid represented by the formula (1) or (2), or an alkali metal salt or an alkaline earth metal salt thereof.

The compound (B) is preferably a barium salt, potassium salt, sodium salt, or rubidium salt of a sulfonic acid represented by the formula (1) or (2).

The compound (B) is preferably a sulfonic acid represented by the formula (1) or a salt thereof.

The fluororesin (A) is preferably a tetrafluoroethylene/hexafluoropropylene copolymer, a tetrafluoroethylene/perfluoro(alkyl vinyl ether) copolymer, or a tetrafluoroethylene/ethylene copolymer.

The fluororesin (A) is preferably a fluorinated fluororesin.

The composition of the present invention preferably further comprises boron nitride.

The boron nitride preferably has an average particle size of 8.0 μm or greater.

The boron nitride preferably has a particle size distribution represented by (D84-D16)/D50 of 1.2 or lower, wherein D84, D50, and D16 represent the particle size (μm) where the cumulative curve of the volume-based particle size distribution reaches 84%, the particle size (μm) where the curve reaches 50%, and the particle size (μm) where the curve reaches 16%, respectively. The accumulation of the particle size distribution starts from the smallest particle size.

The boron nitride is preferably in a pulverized form.

The present invention also relates to a foamed molding which is formed from the above composition.

The present invention also relates to an electric wire comprising a core and a covering material which covers the core and which is formed from the above composition.

The present invention also relates to a method for producing a foamed molding, comprising foam-molding the above composition.

The present invention also relates to a method for producing an electric wire, comprising covering a core with the above composition to provide an electric wire.

Advantageous Effects of Invention

Since the composition of the present invention has the aforementioned structure, it can provide foamed moldings and foamed electric wires which have a small average cell size and a high foam content and which cause fewer sparks.

DESCRIPTION OF EMBODIMENTS

The composition of the present invention comprises a fluororesin (A) and a compound (B) which is a specific sulfonic acid or a salt thereof.

The present invention will be described in detail below.

The fluororesin (A) may be any melt-processable one. Examples thereof include tetrafluoroethylene (TFE)/hexafluoropropylene (HFP) copolymers, TFE/perfluoro(alkyl vinyl ether) (PAVE) copolymers, TFE/ethylene copolymers (ETFE), chlorotrifluoroethylene (CTFE)/ethylene copolymers (ECTFE), polyvinylidene fluoride (PVdF), polychlorotrifluoroethylene (PCTFE), TFE/vinylidene fluoride (VdF) copolymers (VT), polyvinyl fluoride (PVF), TFE/VdF/CTFE copolymers (VTC), TFE/ethylene/HFP copolymers, and TFE/HFP/VdF copolymers.

Examples of the PAVE include perfluoro(methyl vinyl ether) (PMVE), perfluoro(ethyl vinyl ether) (PEVE), and perfluoro(propyl vinyl ether) (PPVE). PPVE is preferred. One of them may be used alone or two or more of them may be used in combination.

The fluororesin may have an additional polymer unit derived from another monomer in an amount that causes no deterioration in the essential properties of the respective fluororesins. Such an additional monomer can appropriately be selected from TFE, HFP, ethylene, propylene, perfluoro(alkyl vinyl ethers), perfluoroalkylethylenes, hydrofluoroolefins, fluoroalkylethylenes, perfluoro(alkyl allyl ethers), and the like. The perfluoroalkyl group in the additional monomer preferably has 1 to 10 carbon atoms.

Because of their excellent heat resistance, the fluororesin is preferably selected from TFE/HFP copolymers, TFE/PAVE copolymers, and TFE/ethylene copolymers, and more preferably selected from TFE/HFP copolymers and TFE/PAVE copolymers. Two or more of these fluororesins may be used in combination. Because of its more excellent electrical properties, the fluororesin is also preferably a perfluororesin.

The TFE/HFP copolymer preferably satisfies a TFE/HFP mass ratio of 80 to 97/3 to 20, and more preferably 84 to 92/8 to 16.

The TFE/HFP copolymer may be a copolymer consisting of TFE and HFP, or may be a terpolymer consisting of TFE, HFP, and a comonomer copolymerizable with TFE and HFP (e.g., a TFE/HFP/PAVE copolymer).

The TFE/HFP copolymer is also preferably a TFE/HFP/PAVE copolymer including a polymer unit derived from PAVE.

The TFE/HFP/PAVE copolymer preferably satisfies a TFE/HFP/PAVE mass ratio of 70 to 97/3 to 20/0.1 to 10, and more preferably 81 to 92/5 to 16/0.3 to 5.

The TFE/PAVE copolymer preferably satisfies a TFE/PAVE mass ratio of 90 to 99/1 to 10, and more preferably 92 to 97/3 to 8.

The TFE/ethylene copolymer preferably satisfies a TFE/ethylene mole ratio of 20 to 80/20 to 80, and more preferably 40 to 65/35 to 60. The TFE/ethylene copolymer may include another monomer component.

In other words, the TFE/ethylene copolymer may be a copolymer consisting of TFE and ethylene, or may be a terpolymer consisting of TFE, ethylene, and a comonomer copolymerizable with TFE and ethylene (e.g., a TFE/ethylene/HFP copolymer).

The TFE/ethylene copolymer may also preferably be a TFE/ethylene/HFP copolymer including a polymer unit derived from HFP. The TFE/ethylene/HFP copolymer preferably satisfies a TFE/ethylene/HFP mole ratio of 40 to 65/30 to 60/0.5 to 20, and more preferably 40 to 65/30 to 60/0.5 to 10.

The fluororesin preferably has a melt flow rate (MFR) of 0.1 to 100 g/10 min. The MFR is more preferably 4 to 70 g/10 min, and still more preferably 19 to 60 g/10 min. In order to suppress the occurrence of sparks and increase the foam content, the MFR is much more preferably 34 to 50 g/10 min, and particularly preferably 34 to 42 g/10 min.

The MFR is a value determined in conformity with ASTM D1238 using a die having a diameter of 2.1 mm and a length of 8 mm at a load of 5 kg and a temperature of 372° C.

The fluororesin can be synthesized by polymerizing monomer components through a usual polymerization method, such as emulsion polymerization, suspension polymerization, solution polymerization, bulk polymerization, or gas phase polymerization. In the polymerization reaction, a chain-transfer agent such as methanol may be used in some cases. The fluororesin may be produced by polymerization and isolation without a metal-ion-containing reagent.

The fluororesin may have an end group such as —$CF_3$ or —$CF_2H$ on at least one of the polymer main and side chains. Although not limited to, the fluororesin is preferably a fluorinated fluororesin. Non-fluorinated fluororesins may have a thermally and electrically unstable end group (hereinafter, such an end group is also referred to as an "unstable end group") such as —COOH, —$CH_2OH$, —COF, and —$CONH_2$. These unstable end groups can be reduced by fluorination.

The fluororesin preferably includes a small number of unstable end groups or no such groups. More preferably, the total number of the above-exemplified four species of unstable end groups and —$CF_2H$ end groups is 50 or less per $1 \times 10^6$ carbon atoms. More than 50 unstable end groups may cause molding defects. The number of unstable end groups is more preferably 20 or less, and still more preferably 10 or less. The number of unstable end groups herein is a value determined by infrared absorption spectrometry. The fluororesin may have neither unstable end groups nor —$CF_2H$ end groups, and all the end groups therein may be —$CF_3$ end groups.

The fluorination can be achieved by bringing a non-fluorinated fluororesin into contact with a fluorine-containing compound.

The fluorine-containing compound may be any such compound, and examples thereof include fluorine radical sources that generate fluorine radicals under the fluorination conditions. Examples of the fluorine radical source include $F_2$ gas, $CoF_3$, $AgF_2$, $UF_6$, $OF_2$, $N_2F_2$, $CF_3OF$, and halogen fluorides (e.g., $IF_5$, $ClF_3$).

The concentration of the fluorine radical source such as $F_2$ gas may be 100%. In order to ensure the safety, the fluorine radical source is preferably diluted with an inert gas to 5 to 50% by mass, and preferably 15 to 30% by mass. Examples of the inert gas include nitrogen gas, helium gas, and argon gas. In order to save the cost, nitrogen gas is preferred.

The fluorination can be performed under any conditions. A molten fluororesin may be brought into contact with a fluorine-containing compound. Still, the fluorination is usually performed at a temperature of not higher than the melting point of the fluororesin, preferably 20° C. to 220° C., and more preferably 100° C. to 200° C. The fluorination is usually performed for 1 to 30 hours, and preferably 5 to 20 hours.

The fluorination is preferably achieved by bringing a non-fluorinated fluororesin with a fluorine gas ($F_2$ gas).

The compound (B) is a sulfonic acid represented by the following formula (1):

(1)

wherein n is 4 or 5, or the following formula (2):

(2)

wherein n is 4 or 5, or a salt thereof.

Since n in the formula of the compound (B) is 4 or 5, the composition can provide foamed moldings and foamed electric wires which have a small average cell size and a high foam content and which cause fewer sparks. Further, use of the compound (B) allows the composition to deal with the environmental issues such as those relating to perfluorooctane sulfonate (PFOS).

If n is 3 or smaller in the sulfonic acid represented by the formula (1) or (2) or a salt thereof, the cells in a molded covering material have a large average cell size. If n is 6 or greater, the resulting products may cause many sparks.

In order to achieve a good balance between the smallness of the average cell size and the possibility of the occurrence of sparks, n in the formula of the compound (B) is preferably 4.

In order to achieve a good balance between the average cell size and foam content of a covering material formed from the composition of the present invention, the compound (B) is preferably a sulfonic acid represented by the formula (1) or (2), or an alkali metal salt or alkaline earth metal salt thereof. Because of its excellent heat resistance, an alkali metal salt or an alkaline earth metal salt is more preferred.

In order to achieve a good balance between the average cell size and foam content of a covering material formed from the composition of the present invention, the compound (B) is still more preferably a barium salt, potassium salt, sodium salt, or rubidium salt of a sulfonic acid represented by the formula (1) or (2).

A sodium or rubidium salt is particularly preferred because it enables production of a covering material having a small average cell size and a high foam content and causing fewer sparks even if the compound (B) is contained in a small amount.

In the composition of the present invention, the amount of the compound (B) is preferably 2000 ppm or less, and more preferably 1500 ppm or less, based on the amount of the fluororesin (A). It is still more preferably 1000 ppm or less, much more preferably 500 ppm or less, and particularly preferably 250 ppm or less.

In the composition of the present invention, the amount of the compound (B) is preferably 0.01 ppm or more based on the amount of the fluororesin (A). It is more preferably 0.1 ppm or more.

Too small an amount of the compound (B) may cause the resulting covering material to have less fine cells. Too large an amount thereof may cause the occurrence of many sparks.

In the case of using a barium salt as the compound (B) in the composition of the present invention, the amount of the compound (B) is preferably 1500 ppm or less based on the amount of the fluororesin (A). It is more preferably 1000 ppm or less, and still more preferably 500 ppm or less.

In the case of using a barium salt as the compound (B) in the composition of the present invention, the amount of the compound (B) is preferably 0.01 ppm or more based on the amount of the fluororesin (A). It is more preferably 0.1 ppm or more, still more preferably 1 ppm or more, much more preferably 4 ppm or more, and particularly preferably 10 ppm or more.

Too small an amount of the compound (B) may lead to a failure in forming fine cells. Too large an amount thereof may cause the occurrence of many sparks.

In the case of using a potassium salt as the compound (B) in the composition of the present invention, the amount of the compound (B) is preferably 2000 ppm or less based on the amount of the fluororesin (A). It is more preferably 1500 ppm or less, still more preferably 1000 ppm or less, and particularly preferably 500 ppm or less.

In the case of using a potassium salt as the compound (B) in the composition of the present invention, the amount of the compound (B) is preferably 0.01 ppm or more based on the amount of the fluororesin (A). It is more preferably 0.1 ppm or more, still more preferably 1 ppm or more, much more preferably 4 ppm or more, and particularly preferably 10 ppm or more.

Too small an amount of the compound (B) may lead to a failure in forming fine cells. Too large an amount thereof may cause the occurrence of many sparks.

The compound (B) is preferably a sodium salt. In the case of using a sodium salt as the compound (B) in the composition of the present invention, the amount of the compound (B) is preferably 250 ppm or less based on the amount of the fluororesin (A). It is more preferably 100 ppm or less.

In the case of using a sodium salt as the compound (B) in the composition of the present invention, the amount of the compound (B) is preferably 0.01 ppm or more based on the amount of the fluororesin (A). It is more preferably 0.1 ppm or more, still more preferably 1 ppm or more, much more preferably 4 ppm or more, and particularly preferably 10 ppm or more.

Too small an amount of the compound (B) may lead to a failure in forming fine cells. Too large an amount thereof may cause the occurrence of many sparks.

The compound (B) is preferably a rubidium salt because this salt makes it very easy to control the foam content. In the case of using a rubidium salt as the compound (B) in the composition of the present invention, the amount of the compound (B) is preferably 500 ppm or less based on the amount of the fluororesin (A). It is more preferably 250 ppm or less.

In the case of using a rubidium salt as the compound (B) in the composition of the present invention, the amount of the compound (B) is preferably 0.01 ppm or more based on the amount of the fluororesin (A). It is more preferably 0.1 ppm or more, still more preferably 1 ppm or more, much more preferably 4 ppm or more, and particularly preferably 10 ppm or more.

Too small an amount of the compound (B) may lead to a failure in forming fine cells. Too large an amount thereof may cause the occurrence of many sparks.

In general, C—F bonds have a higher binding energy and a chemically stronger structure than C—H bonds. Thus, the compound (B) is more preferably a sulfonic acid of the formula (1) or a salt thereof having no C—H bond.

The composition of the present invention preferably further comprises boron nitride. The composition comprising boron nitride can provide covering materials having a smaller average cell size and containing finer, more uniform cells.

The boron nitride preferably has an average particle size of 8.0 μm or greater. The technicians tend to make the average particle size of boron nitride small and never specifically examined the use of boron nitride having a relatively large average particle size.

The composition of the present invention containing boron nitride having an average particle size within the above specific range can provide foamed electric wires which comprise a covering material having a smaller average cell size and a higher foam content.

The average particle size of the boron nitride is more preferably 9.0 μm or greater, still more preferably 10.0 μm or greater, much more preferably 10.5 μm or greater, particularly preferably 11.0 μm or greater, more particularly preferably 12.0 μm or greater, and most preferably 13.0 μm or greater.

Boron nitride having too large an average particle size may increase the average cell size or cause the occurrence of many sparks. The average particle size of the boron nitride is preferably 25 μm or smaller, and more preferably 20 μm or smaller.

The boron nitride having an average particle size within the above range enables production of covering materials having fine, uniform cells.

The average particle size of the boron nitride is a value determined using a laser diffraction scattering particle size distribution analyzer. In the case of a wet process, any appropriately selected medium such as methanol can be used.

The boron nitride preferably has a particle size distribution (D84-D16)/D50 of 1.2 or lower.

When a cumulative curve is drawn with the whole volume of the group of the boron nitride powder taken as 100%, the above D84, D50, and D16 represent the particle size (μm) at the point where the curve reaches 84%, the particle size (μm) at the point where the curve reaches 50%, and the particle size (μm) at the point where the curve reaches 16%, respectively. The accumulation of the particle size distribution starts from the smallest particle size. The whole volume of the group of the powder can be determined on a sample prepared by dispersing the boron nitride powder in a medium such as methanol using a laser diffraction scattering particle size distribution analyzer (e.g., Microtrac MT3300, NIKKISO CO., LTD.).

The boron nitride having a particle size distribution within the above range enables production of covering materials having fine, uniform cells and more suppression of the occurrence of sparks.

The particle size distribution is more preferably 1.1 or lower, and still more preferably 1.0 or lower. The lower limit of the particle size distribution is not particularly limited, and it may be 0.1, for example.

The cumulative curve of the particle size distribution (volume-based particle size distribution) can be obtained using a laser diffraction scattering particle size distribution analyzer (e.g., Microtrac MT3300, NIKKISO CO., LTD.). In the case of a wet process, any appropriate medium such as methanol can be used.

The boron nitride is preferably in a pulverized form. Such pulverized boron nitride can more suppress the occurrence of sparks.

The pulverization can be performed by any method under any conditions which can make the average particle size and particle size distribution of the boron nitride fall within the above respective ranges. For example, the type and conditions of a pulverizer are appropriately selected. Examples of the pulverizer include jet mills, hammer mills, ball mills, and pin mills.

The average particle size and particle size distribution of the boron nitride can be adjusted to fall within the above respective ranges by classification.

In the composition of the present invention, the amount of the boron nitride is, although not limited to, preferably 0.1 to 10% by mass, more preferably 0.1 to 2.0% by mass, still more preferably 0.1 to 1.5% by mass, and much more preferably 0.1 to 1.0% by mass, for example. Too small an amount of the boron nitride may fail to give fine cells to the resulting covering materials for foamed electric wires. Too large an amount thereof may cause an increase in the production cost.

The composition of the present invention may further comprise a polyatomic anion-containing inorganic salt in an amount that does not deteriorate the effects of the present invention.

Examples of the polyatomic anion-containing inorganic salt include those disclosed in U.S. Pat. No. 4,764,538 A.

The composition of the present invention may further comprise any of sulfonic acids, phosphonic acids, and salts thereof excluding the compound (B) in an amount that does not deteriorate the effects of the present invention.

The composition of the present invention may comprise, in addition to the fluororesin and the compound (B), conventionally known filler in an amount that does not deteriorate the effects of the present invention.

Examples of the filler include graphite, carbon fiber, coke, silica, zinc oxide, magnesium oxide, tin oxide, antimony oxide, calcium carbonate, magnesium carbonate, glass, talc, mica, mica, aluminum nitride, calcium phosphate, sericite, diatomite, silicon nitride, fine silica, alumina, zirconia, quartz powder, kaolin, bentonite, and titanium oxide. The filler may be in any form. For examples, the filler may be in the form of fibers, needles, powder, particles, beads, or the like. The filler is different from the boron nitride.

The composition of the present invention may further comprise a thermoplastic resin that is different from the aforementioned fluororesin. Examples of the thermoplastic resin different from the aforementioned fluororesin include general-purpose resins such as polyethylene resin, polypropylene resin, vinyl chloride resin, and polystyrene resin; and engineering plastics such as nylon, polycarbonate, polyether ether ketone resin, and polyphenylene sulfide resin.

The composition of the present invention may further comprise any of other components such as additives. Examples of such components include fillers such as glass fiber, glass powder, and asbestos fiber, reinforcing agents, stabilizers, lubricants, pigments, and other additives.

The composition of the present invention can be produced by, for example, a production method including mixing the fluororesin and the compound (B), and optionally any of boron nitride, fillers, additives, and the like, to provide a mixture (hereinafter, also referred to as a "method for producing the composition").

The mixing method may be any conventionally known method, for example. Preferred is a mixing method in which the compound (B) is less likely to coagulate.

The mixing method may be one using a Henschel mixer, a ribbon mixer, a V blender, a ball mill, or the like. A mixing method utilizing melt-kneading may be used.

If the composition of the present invention contains boron nitride, the production method for such a composition may include pulverizing and/or classifying the boron nitride before the mixing. For example, the pulverization and/or classification can provide boron nitride having an average particle size of 8.0 μm or greater or boron nitride having a particle size distribution of 1.2 or lower. In order to suppress the occurrence of sparks, the above step is more preferably pulverization of the boron nitride.

The production method for the composition of the present invention may include kneading the mixture prepared in the above mixing. The kneading provides pellets. The kneading can be performed by a method using a conventionally known melt-kneading device such as a single screw extruder or a twin screw extruder.

The method for producing the composition may include fluorinating the fluororesin. The fluorination can be performed by any of the aforementioned methods. For example, the fluorination may be performed by bringing the pellets prepared by the above kneading into contact with the aforementioned fluorine-containing compound.

The above described components that may be contained in the composition of the present invention, such as thermoplastic resins excluding the fluororesin, boron nitride, polyatomic anion-containing inorganic salts, fillers, and other additives, can appropriately be added in any of the steps of the method for producing the composition in accordance with the properties and the like factors of the components. The fluororesin and the boron nitride may further be added.

The composition of the present invention can suitably be used as a foamable composition. The composition can also suitably be used as a composition for foamed moldings. The composition can further be suitably used as a composition for forming covering materials of electric wires.

The method for producing a foamed molding of the present invention includes foam-molding the aforementioned composition.

The composition can be foam-molded by any method, including conventionally known methods. For example, the fluororesin of the present invention in the molten state (molten resin) is charged together with a gas into a screw extruder designed for foaming operations, and then a continuous gas injection method is performed.

Examples of the gas include gases of chlorodifluoromethane, nitrogen, and carbon dioxide, and any mixtures of these gases. The gas in the form of a pressurized gas may be introduced into the molten resin in the extruder, or the gas may be generated by mingling a chemical foaming agent into the molten resin. The gas dissolves in the molten resin in the extruder.

When the molten material is extruded through an extrusion die, the gas dissolved in the molten resin emerges from the molten material in response to this sudden pressure decrease. The material extruded through the extruder is then, for example, put into water to be cooled down and solidified.

Since the foamed molding is a product of foam-molding the composition, it has a low permittivity, a stable capacitance, and a light weight, and it can provide a covering material to be mentioned later having stable dimensions such as the wire diameter and the thickness.

The total volume of the cells in the foamed molding can appropriately be adjusted so as to fit the use thereof by, for example, adjusting the amount of gas introduced into the extruder or selecting the type of gas to be dissolved.

The foamed molding can be produced as a molded material extruded through the extruder so as to have a shape that fits the use thereof. The molding method can be any heat melt molding, and examples thereof include extrusion foam molding, injection foam molding, and mold foam molding.

The foamed molding can have any shape. For example, it can be formed into any of various shapes, including the covering materials such as foamed electric wires; filament-like shapes such as the shapes of wire rods; sheet-like shapes; film-like shapes; rod-like shapes; and pipe-like shapes. Examples of the use of the foamed molding include electrical insulating materials; heat insulating materials; sound insulating materials; light-weight structural materials such as floating materials; and cushioning materials such as cushions. The foamed molding can particularly suitably be used as a covering material for foamed electric wires.

Preferably, the resulting foamed molding contains a melt-solidified matter of the composition of the present invention and cells, and the cells are uniformly distributed in the melt-solidified matter. The cells may have any average cell size, and it is preferably 60 μm or smaller, for example. The average cell size is also preferably 0.1 μm or greater.

The foamed molding may have any foam content, and the ratio is preferably 20% or higher. The upper limit of the foam content may be, although not limited to, 80%.

The method for producing an electric wire of the present invention includes covering a core with the composition to provide an electric wire. The use of the composition enables to form a foamed electric wire comprising a covering material that includes fine, uniform cells. The production of an electric wire preferably includes foam-molding the composition.

The electric wire produced by the method for producing an electric wire comprises a core and a covering material formed from the composition. An electric wire comprising a core covered with the composition is also one aspect of the present invention.

Since the covering material comprises a core covered with the composition, it includes fine, uniform cells. Further, the covering material can have a low permittivity, a stable capacitance, a light weight, and a shape having stable dimensions such as the diameter and the thickness.

The electric wire can be produced by a conventionally known method except that the core is covered with the aforementioned composition. For example, the electric wire can be produced by extrusion foam molding. Preferable conditions for extrusion molding can appropriately be selected in accordance with the components of the composition and the size of the core.

Examples of a method of covering the core with the composition include a method in which the composition of the present invention is charged into a screw extruder designed for foaming operations, and a continuous gas injection method is performed using a gas soluble to a molten fluororesin (molten resin). The gas may be the same gas as used in the method for producing a foamed molding.

Preferably, the resulting covering material comprises a melt-solidified matter of the composition of the present invention and cells, and the cells are uniformly distributed in the melt-solidified matter.

The cells may have any average cell size. For example, the average cell size is preferably 60 μm or smaller, more preferably 45 μm or smaller, still more preferably 35 μm or smaller, much more preferably 30 μm or smaller, particularly preferably 25 μm or smaller, and more particularly preferably 23 μm or smaller. The average cell size is also preferably 0.1 μm or greater, and more preferably 1 μm or greater.

Such a structure of the covering material is attributed to the specific average particle size of the boron nitride in the composition of the present invention.

The average cell size is a value determined as follows: taking an image of the cross section of the covering material by a scanning electron microscope (SEM); processing the image and calculating the diameters of the respective cells; and calculating the average value thereof.

The covering material preferably has a foam content of 20% or higher. It is more preferably 30% or higher, still more preferably 33% or higher, and much more preferably 35% or higher. The upper limit thereof may be, although not limited to, 80%. The upper limit of the foam content may be 60%.

The foam content is a value determined by [{(specific gravity of fluororesin)−(specific gravity of foam)}/(specific gravity of fluororesin)]×100. The foam content can appropriately be adjusted so as to suit the use thereof by, for example, adjusting the amount of gas to be introduced into the extruder or selecting the type of gas to be dissolved.

The covering material preferably causes less than five sparks per 3500 m. It more preferably causes less than three sparks, and still more preferably not more than one spark.

The number of sparks is a value determined by measurement at a voltage of 1500 V using a spark tester HFS1220 (Beta LaserMike).

The material of the core may be a conductive metal material such as copper or aluminum, for example. The core is preferably 0.02 to 3 mm in diameter. The diameter of the core is more preferably 0.04 mm or greater, still more preferably 0.05 mm or greater, and particularly preferably 0.1 mm or greater. The diameter of the core is more preferably 2 mm or smaller.

The covering material of the electric wire is preferably 0.1 to 3.0 mm in thickness. The thickness of the covering material is also preferably 2.0 mm or smaller.

Specific examples of the core include those satisfying AWG-46 (40-μm-diameter solid copper wires), those satisfying AWG-26 (404-μm-diameter solid copper wires), those satisfying AWG-24 (510-μm-diameter solid copper wires), and those satisfying AWG-22 (635-μm-diameter solid copper wires); here, AWG represents the American wire gauge.

The foamed electric wire comprises a core and a covering material that covers the core. Examples of the use of the foamed electric wire include cables for connecting computers and peripherals, such as cables for LAN.

The electric wire may have a double-layered (skin-foam) structure comprising a core, a covering material, and a non-foam layer disposed therebetween, a double-layered (foam-skin) structure comprising a non-foam layer that covers the peripheral layer of the wire, or a triple-layered (skin-foam-skin) structure comprising a non-foam layer that covers the peripheral layer of the skin-foam structure.

The non-foam layer of the electric wire may be any resin layer formed of a resin such as any of TFE/HFP copolymers, TFE/PAVE copolymers, TFE/ethylene copolymers, vinylidene fluoride polymers, polyolefin resins (e.g., polyethylene (PE)), and polyvinyl chloride (PVC).

EXAMPLES

The present invention is described in detail below referring to, but not limited to, examples.

The properties herein were determined by the following methods.

(Average Particle Size and Particle Size Distribution of Boron Nitride)

About 30 mg of boron nitride powder was put into about 20 ml of methanol and dispersed therein for two minutes using a ultrasonic cleaner (electric power: 100 W). Then, the parameters were determined using Microtrac MT3300 (NIKKISO CO., LTD.) by a wet process (transmission, particle refractive index: 1.63). The average particle size and the particle size distribution were each determined twice, and the average values of the respective parameters were determined.

The particle size distribution was determined as follows. A cumulative curve was drawn with the whole volume of the group of boron nitride powder taken as 100%. The D84, D50, and D16 values were calculated from the cumulative curve, and the value represented by (D84−D16)/D50 was used as the standard of the particle size distribution. The D84, D50, and D16 values represent the particle size (μm) at the point where the curve reaches 84%, the particle size (μm) at the point where the curve reaches 50%, and the particle size (μm) at the point where the curve reaches 16%, respectively. The accumulation of the particle size distribution started from the smallest particle size.

This method of measuring the particle size distribution is a usual method and the D50 value, which is a cumulative average value (median diameter), is one of the usual parameters for evaluating the particle size distribution.

(Melting Point)

The melting point of the fluororesin was a temperature corresponding to the peak in the measurement using RDC220 (Seiko Instruments Inc.) at a temperature-increasing rate of 10° C./min.

(MFR)

The MFR of the fluororesin was a value determined in conformity with ASTM D1238 using a KAYENESS Series 4000 melt indexer (YASUDA SEIKI SEISAKUSHO, LTD.) and a die having a diameter of 2.1 mm and a length of 8 mm at a temperature of 372° C. and a load of 5 kg.

(Average Cell Size)

The average cell size was determined by taking a SEM image of the cross section of the electric wire, processing the image and calculating the diameters of the cells, and calculating the average value thereof.

(Capacitance)

The capacitance was determined using CAPAC300 19C (ZUMBACH Electronic AG).

(Number of Sparks)

The number of sparks per 3500 m was determined using Beta LaserMike Sparktester HFS1220 at a voltage of 1500 V.

(Foam Content)

The foam content was determined by [{(specific gravity of fluororesin)−(specific gravity of foam)}/(specific gravity of fluororesin)]×100.

Examples 1 to 39 and Comparative Examples 1 to 13

Non-pulverized boron nitride (hereinafter, referred to as BN) powders having an average particle size of 13.5 μm, 8 μm, or 2 μm were prepared.

Non-pulverized BN powders having an average particle size of 19 μm or 22 μm were pulverized using a jet mill, preparing pulverized BN powders having an average particle size of 8 μm or 13 μm.

The particle size distributions of these non-pulverized BN powders and pulverized BN powders were determined. The particle size distributions of the BN powders in the respective examples and comparative examples are shown in Tables 1 to 6.

The non-pulverized BN powder or the pulverized BN powder was mixed with the following fluorinated FEP pellet such that the amount of the BN and the FEP pellet was 5% by weight of the sum of the amounts of the FEP pellet and the BN, and then a pellet was produced in the same manner as disclosed in WO 03/000792.

Further, the additive shown in one of Tables 1 to 6 and the fluorinated FEP pellet were mixed such that the amount of the additive was 1% by weight of the sum of the amounts of the FEP pellet and the additive, and then a pellet was produced in the same manner as disclosed in WO 03/000792.

One of these pellets and one of the following fluorinated FEP pellets were melt-kneaded such that the weight of the additive shown in one of Tables 1 to 6 reached the target weight, thereby providing the target pellet (composition).

FEP pellet (A): produced by the same method as disclosed in JP 2011-514407 T (Example 2), TFE/HFP/PAVE copolymer, TFE/HFP/PAVE=87.5/11.5/1.0 (weight ratio), melting point: 255° C., melt flow rate (MFR): 23 g/10 min, total number of unstable end groups and —$CF_2H$ end groups: 0

FEP pellet (B): produced by the same method as disclosed in JP 2011-514407 T (Example 8), TFE/HFP/PAVE copolymer, TFE/HFP/PAVE=87.7/11.3/1.0 (weight ratio), melting point: 255° C., melt flow rate (MFR): 36 g/10 min, total number of unstable end groups and —$CF_2H$ end groups: 0

FEP pellet (C): produced by the same method as disclosed in JP 2010-539252 T (Example 1), TFE/HFP/PAVE copolymer, TFE/HFP/PAVE=87.8/11.2/1.0 (weight ratio), melting point: 255° C., melt flow rate (MFR): 35 g/10 min, total number of unstable end groups and —$CF_2H$ end groups: 0

FEP pellet (D): produced by the same method as disclosed in JP 2011-514407 T (Example 8) except that the amount of methanol for molecular weight adjustment was 125 LBS, TFE/HFP/PAVE copolymer, TFE/HFP/PAVE=87.7/11.3/1.0 (weight ratio), melting point: 255° C., melt flow rate (MFR): 41 g/10 min, total number of unstable end groups and —$CF_2H$ end groups: 0

The additives shown in Tables 1 to 6 are as follows.

Figure 1:
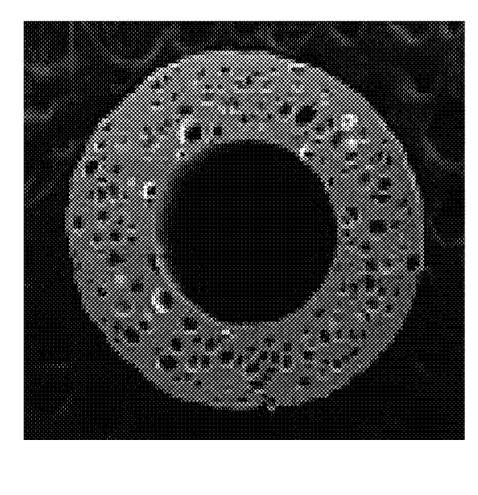
FIG. 1 is a photograph showing the cross section of an electric wire produced in Example 2.

C4Ba salt: $(C_4F_9SO_3)_2Ba$
C4K salt: $C_4F_9SO_3K$
C4Na salt: $C_4F_9SO_3Na$
C4Rb salt: $C_4F_9SO_3Rb$
C1Na salt: $CF_3SO_3Na$
C3Li salt: $C_3F_7SO_3Li$
C8Ba salt: $\{F(CF_2)_6CH_2CH_2SO_3\}_2Ba$ An extruder for foam molding was set to the extruder temperature shown in Table 8, and nitrogen gas as a foaming agent was introduced into the melt-kneading part of the extruder. The pellet (composition) produced by the aforementioned method was charged into the extruder and then extrusion foam molded. The foamed molding was then applied to the surface of a copper wire. Thereby, an electric wire comprising a covering material was produced. FIG. 1 is a photograph showing the cross section of the electric wire produced in Example 2.

The results of evaluating the properties of the resulting electric wires are shown in Tables 1 to 6.

The extruder for foam molding comprises an extruder and a system (each available from Hijiri Manufacturing Ltd.), a gas injection nozzle (Micodia), and a crosshead (UNITEK JAPAN Co., Ltd.). The structure and the conditions of the extruder are as shown in Table 7, and the screw comprises a mixing zone for uniformly dispersing the nitrogen introduced.

TABLE 1

| | Unit | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| FEP | — | A | A | A | A | A | A | A | A | A | B | C |
| BN pulverization | — | Non-pulverized | Non-pulverized | Non-pulverized | Non-pulverized | Non-pulverized | Pulverized | Pulverized | Non-pulverized | — | Pulverized | Pulverized |
| BN average particle size | μm | 13.5 | 13.5 | 13.5 | 13.5 | 13.5 | 8. | 13 | 13.5 | — | 13 | 8 |

TABLE 1-continued

|  | Unit | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Particle size distribution (D84 − D16)/D50 | — | 1.41 | 1.41 | 1.41 | 1.41 | 1.41 | 0.85 | 0.92 | 1.41 | — | 0.92 | 0.85 |
| BN content | % by weight | 0.4 | 0.4 | 0.4 | 0.4 | 0.4 | 0.4 | 0.4 | 0.2 | 0 | 0.4 | 0.4 |
| Additive | — | C4Ba salt | C4Ba salt | C4Ba salt | C4Ba salt | C4Ba salt | C4Ba salt | C4Ba salt | C4Ba salt | C4Ba salt | C4Ba salt | C4Ba salt |
| Additive content (based on amount of resin) | ppm | 250 | 500 | 1000 | 1500 | 2000 | 1000 | 1000 | 1000 | 1000 | 1000 | 1000 |
| Nitrogen gas pressure in extrusion foam molding | MPa | 30 | 30 | 30 | 30 | 30 | 30 | 30 | 30 | 30 | 30 | 30 |
| Extrusion speed in extrusion foam molding | m/min | 73 | 75 | 77 | 81 | 84 | 76.5 | 77 | 76 | 73 | 78 | 77.5 |
| Number of sparks | /3500 m | 0 | 1 | 6 | 48 | >100 | 0 | 1 | 0 | 2 | 0 | 0 |
| Capacitance | pF/m | 149 | 149 | 145 | 141 | Unmeasurable | 146 | 146 | 146 | 144 | 144 | 144 |
| Expansion ratio | % | 34 | 33 | 36 | 38 | 40 | 33 | 36 | 35 | 32.6 | 36 | 35 |
| Average cell size | μm | 23 | 21 | 23 | 18 | 19 | 20 | 23 | 19 | 32.7 | 23 | 20 |

TABLE 2

|  | Unit | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|
| FEP | — | A | A | A | A | A | A | A | A | A | B | C |
| BN pulverization | — | Non-pulverized | Non-pulverized | Non-pulverized | Non-pulverized | Non-pulverized | Pulverized | Pulverized | Non-pulverized | — | Pulverized | Pulverized |
| BN average particle size | μm | 13.5 | 13.5 | 13.5 | 13.5 | 13.5 | 8 | 13 | 13.5 | — | 8 | 13 |
| Particle size distribution (D84 − D16)/D50 | — | 1.41 | 1.41 | 1.41 | 1.41 | 1.41 | 0.85 | 0.92 | 1.41 | — | 0.85 | 0.92 |
| BN content | % by weight | 0.4 | 0.4 | 0.4 | 0.4 | 0.4 | 0.4 | 0.4 | 02 | 0 | 0.4 | 0.4 |
| Additive | — | C4K salt | C4K salt | C4K salt | C4K salt | C4K salt | C4K salt | C4K salt | C4K salt | C4K salt | C4K salt | C4K salt |
| Additive content (based on amount of resin) | ppm | 250 | 500 | 1000 | 1500 | 2000 | 1000 | 1000 | 1000 | 500 | 1000 | 1000 |
| Nitrogen gas pressure in extrusion foam molding | MPa | 30 | 30 | 30 | 30 | 30 | 30 | 30 | 30 | 30 | 30 | 30 |
| Extrusion speed extrusion foam in molding | m/min | 74 | 74 | 75 | 80 | 75 | 76 | 75 | 73 | 68 | 77 | 76 |
| Number of sparks | /3500 m | 8 | 0 | 12 | 14 | 22 | 1 | 1 | 0 | 0 | 0 | 0 |

TABLE 2-continued

|  | Unit | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|
| Capacitance | pF/m | 147 | 148 | 148 | 146 | 145 | 149 | 145 | 149 | 151 | 148 | 144 |
| Expansion ratio | % | 35 | 34 | 35 | 36 | 40 | 33 | 34 | 32 | 29 | 34 | 36 |
| Average cell size | μm | 27 | 22 | 20 | 18 | 16 | 21 | 22 | 24 | 45 | 21 | 23 |

TABLE 3

|  | Unit | Example 23 | Example 24 | Example 25 | Example 26 | Example 27 | Example 28 | Example 29 | Example 30 |
|---|---|---|---|---|---|---|---|---|---|
| FEP | — | A | A | A | A | A | A | B | C |
| BN pulverization | — | Pulverized | Pulverized | Pulverized | Pulverized | — | — | Pulverized | Pulverized |
| BN average particle size | μm | 13 | 13 | 13 | 13 | — | — | 13 | 13 |
| Particle size distribution (D84 − D16)/D50 | — | 0.92 | 0.92 | 0.92 | 0.92 | — | — | 0.92 | 0.92 |
| BN content | % by weight | 0.4 | 0.4 | 0.4 | 0.4 | 0 | 0 | 0.4 | 0.4 |
| Additive | — | C4Na salt | C4Na salt | C4Na salt | C4Na salt | C4Na salt | C4Na salt | C4Na salt | C4Na salt |
| Additive content (based on amount of resin) | ppm | 25 | 100 | 250 | 500 | 100 | 500 | 100 | 100 |
| Nitrogen gas pressure in extrusion foam molding | MPa | 30 | 30 | 30 | 30 | 30 | 30 | 30 | 30 |
| Extrusion speed in extrusion foam molding | m/min | 75 | 75 | 76 | 77.5 | 70 | 72 | 76 | 77 |
| Number of sparks | /3500 m | 0 | 0 | 5 | >100 | 3 | >100 | 0 | 0 |
| Capacitance | pF/m | 146 | 146 | 145 | 147 | 146 | Varied greatly | 145 | 144 |
| Expansion ratio | % | 34 | 34 | 35 | 35 | 29.7 | 35.4 | 35 | 36 |
| Average cell size | μm | 24 | 22 | 19 | 18 | 32.1 | 28.3 | 22 | 22 |

TABLE 4

|  | Unit | Example 31 | Example 32 | Example 33 | Example 34 | Example 35 | Example 36 | Example 37 | Example 38 | Example 39 |
|---|---|---|---|---|---|---|---|---|---|---|
| FEP | — | A | A | A | A | A | A | B | C | D |
| BN pulverization | — | Pulverized | Pulverized | Pulverized | Pulverized | Pulverized | — | Pulverized | Pulverized | Pulverized |
| BN average particle size | μm | 13 | 13 | 13 | 13 | 13 | — | 13 | 13 | 13 |
| Particle size distribution (D84 − D16)/D50 | — | 0.92 | 0.92 | 0.92 | 0.92 | 0.92 | — | 0.92 | 0.92 | 0.92 |
| BN content | % by weight | 0.4 | 0.4 | 0.4 | 0.4 | 0.4 | 0 | 0.4 | 0.4 | 0.4 |
| Additive | — | C4Rb salt | C4Rb salt | C4Rb salt | C4Rb salt | C4Rb salt | C4Rb salt | C4Rb salt | C4Rb salt | C4Rb salt |
| Additive content (based on amount of resin) | ppm | 25 | 100 | 250 | 500 | 1000 | 250 | 250 | 100 | 100 |
| Nitrogen gas pressure in extrusion foam molding | MPa | 30 | 30 | 30 | 30 | 30 | 30 | 30 | 30 | 30 |
| Extrusion speed in extrusion foam molding | m/min | 75 | 76.5 | 75 | 75.5 | 77 | 64 | 77 | 77 | 77.5 |
| Number of sparks | /3500 m | 3 | 3 | 0 | 31 | >100 | 5 | 0 | 0 | 0 |
| Capacitance | pF/m | 146 | 146 | 146 | 146 | 149 | 156 | 144 | 145 | 144 |
| Expansion ratio | % | 33 | 36 | 35 | 34 | 36 | 27.1 | 36 | 37 | 37 |
| Average cell size | μm | 23 | 22 | 22 | 23 | 22 | 34.3 | 22 | 22 | 22 |

TABLE 5

|  | Unit | Comparative Example 1 | Comparative Example 2 | Comparative Example 3 | Comparative Example 4 | Comparative Example 5 |
|---|---|---|---|---|---|---|
| FEP | — | A | A | A | A | A |
| BN pulverization | — | Non-pulverized | Non-pulverized | Non-pulverized | Pulverized | Pulverized |
| BN average particle size | μm | 13.5 | 13.5 | 13.5 | 13 | 13 |
| Particle size distribution (D84 − D16)/D50 | — | 1.41 | 1.41 | 1.41 | 0.92 | 0.92 |

TABLE 5-continued

|  | Unit | Comparative Example 1 | Comparative Example 2 | Comparative Example 3 | Comparative Example 4 | Comparative Example 5 |
|---|---|---|---|---|---|---|
| BN content | % by weight | 0.4 | 0.4 | 0.4 | 0.4 | 0.4 |
| Additive | — | — | C3Li salt | C3Li salt | C3Li salt | C1Na salt | C1Na salt |
| Additive content (based on amount of resin) | ppm | — | 250 | 500 | 1000 | 1000 | 1500 |
| Nitrogen gas pressure in extrusion foam molding | MPa | 30 | 30 | 30 | 30 | 30 |
| Extrusion speed in extrusion foam molding | m/min | 75.5 | 78.5 | 82 | 74 | 75 |
| Number of sparks | /3500 m | 1 | 43 | >100 | 0 | 33 |
| Capacitance | pF/m | 144 | 142 | 134 | 146 | 144 |
| Expansion ratio | % | 34 | 37 | 39 | 35 | 36 |
| Average cell size | μm | 34 | 26 | 24 | 32 | 31 |

Note: the Additive row has an extra column due to a dash in column 1.

TABLE 6

|  | Unit | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|
| FEP | — | A | A | A | A | A | A | A | A |
| BN pulverization | — | Non-pulverized | Non-pulverized | Non-pulverized | Non-pulverized | Non-pulverized | Non-pulverized | Non-pulverized | — |
| BN average particle size | μm | 13.5 | 13.5 | 13.5 | 13.5 | 8 | 2 | 13.5 | — |
| Particle size distribution (D84 − D16)/D50 | — | 1.41 | 1.41 | 1.41 | 1.41 | 1.36 | 1.24 | 1.41 | — |
| BN content | % by weight | 0.4 | 0.4 | 0.1 | 0.2 | 0.4 | 0.4 | 0.4 | 0 |
| Additive | — | C8Ba salt | C8Ba salt | C8Ba salt | C8Ba salt | C8Ba salt | C8Ba salt | No additive | C8Ba salt |
| Additive content (based on amount of resin) | ppm | 25 | 250 | 250 | 250 | 250 | 250 | 0 | 250 |
| Nitrogen gas pressure in extrusion foam molding | MPa | 30 | 30 | 30 | 30 | 30 | 30 | 30 | 30 |
| Extrusion speed in extrusion foam molding | m/min | 72 | 77 | 77 | 77 | 79.5 | — | 72 | — |
| Number of sparks | /3500 m | 0 | 26 | >100 | 58 | >100 | — | 0 | Failed to continue molding due to frequent cone-breaks |
| Capacitance | pF/m | 149 | 145 | 140 | 142 | 135 | — | 152 |  |
| Expansion ratio | % | 33 | 37 | 38 | 37 | 37 | — | 33 |  |
| Average cell size | μm | 32 | 29 | 19 | 20 | 15 | — | 43 |  |

TABLE 7

| Extruder conditions | |
|---|---|
| Extruder size | φ 35 mm |
| Die size | 4.7 mm |
| Tip size | 2.2 mm |
| Screw speed | 18 rpm |
| Core (mm) | 0.6 mm |
| Outer diameter (mm) | 1.1 mm |
| Nitrogen pressure (MPa) | 30 MPa |
| Nitrogen flow rate (cc/min) | About 15 cc/min |

TABLE 8

| Extruder temperature | |
|---|---|
| C1 | 330° C. |
| C2 | 360° C. |
| C3 | 370° C. |
| C4 | 380° C. |
| C5 | 380° C. |
| H1 | 375° C. |
| H2 | 365° C. |
| H3 | 360° C. |

INDUSTRIAL APPLICABILITY

The composition of the present invention can suitably be used as a material for forming covering materials of foamed electric wires.

The invention claimed is:

1. A composition comprising:
   a fluororesin (A);
   boron nitride having an average particle size of 13.0 μm or greater; and
   a compound (B) which is a barium salt, potassium salt, sodium salt, or rubidium salt of a sulfonic acid, the sulfonic acid being represented by the following formula (1):

$$F(CF_2)_nSO_3H \quad (1)$$

wherein n is 4, or the following formula (2):

$$F(CF_2)_nCH_2CH_2SO_3H \quad (2)$$

wherein n is 4,
wherein the amount of the barium salt is 1000 ppm or less based on the amount of the fluororesin (A),
wherein the amount of the potassium salt is 2000 ppm or less based on the amount of the fluororesin (A),
wherein the amount of the sodium salt is 250 ppm or less based on the amount of the fluororesin (A), and
wherein the amount of the rubidium salt is 250 ppm or less based on the amount of the fluororesin (A).

2. The composition according to claim 1,
wherein the compound (B) is a barium salt, potassium salt, sodium salt, or rubidium salt of a sulfonic acid represented by the formula (1).

3. The composition according to claim 1,
wherein the fluororesin (A) is a tetrafluoroethylene/hexafluoropropylene copolymer, a tetrafluoroethylene/perfluoro(alkyl vinyl ether) copolymer, or a tetrafluoroethylene/ethylene copolymer.

4. The composition according to claim 1,
wherein the fluororesin (A) is a fluorinated fluororesin.

5. The composition according to claim 1,
wherein the boron nitride has a particle size distribution represented by (D84−D16)/D50 of 1.2 or lower.

6. The composition according to claim 1,
wherein the boron nitride is in a pulverized form.

7. A foamed molding,
which is formed from the composition according to claim 1.

8. An electric wire comprising
a core, and
a covering material which covers the core and which is formed from the composition according to claim 1.

9. A method for producing a foamed molding, comprising foam-molding the composition according to claim 1.

10. A method for producing an electric wire, comprising covering a core with the composition according to claim 1 to provide an electric wire.

* * * * *